Patented Oct. 11, 1938

2,133,070

UNITED STATES PATENT OFFICE 2,133,070

PROCESS FOR MANUFACTURING MOTOR FUELS

Malcolm P. Youker, Bartlesville, Okla., assignor to Phillips Petroleum Company, Bartlesville, Okla., a corporation of Delaware Original application February 12, 1932, Serial No. 592,614. Divided and this application February 25, 1936, Serial No. 65,689

2 Claims. (Cl. 196—9)

This invention relates to improvements in processes for converting hydrocarbon liquids or gases, and the present application is a division of my application Serial No. 592,614, filed February 12, 1932.

An object of the invention is to provide a process by which gasoline having a high antiknock rating and other desirable qualities may be manufactured directly from crude oil.

Another object is to minimize the losses due to conversion of liquids to gases which normally results from the conversion of heavy hydrocarbon liquids to lighter hydrocarbon liquids.

These desirable ends, as well as others, are attained by the process.

With the foregoing objects outlined and with other objects in view, which will appear as the description proceeds, the invention consists in the novel features hereinafter described in detail, illustrated in the accompanying drawings and more particularly pointed out in the appended claims.

The form of apparatus by which my new process is carried out is illustrated on the accompanying drawings.

Figure 1:
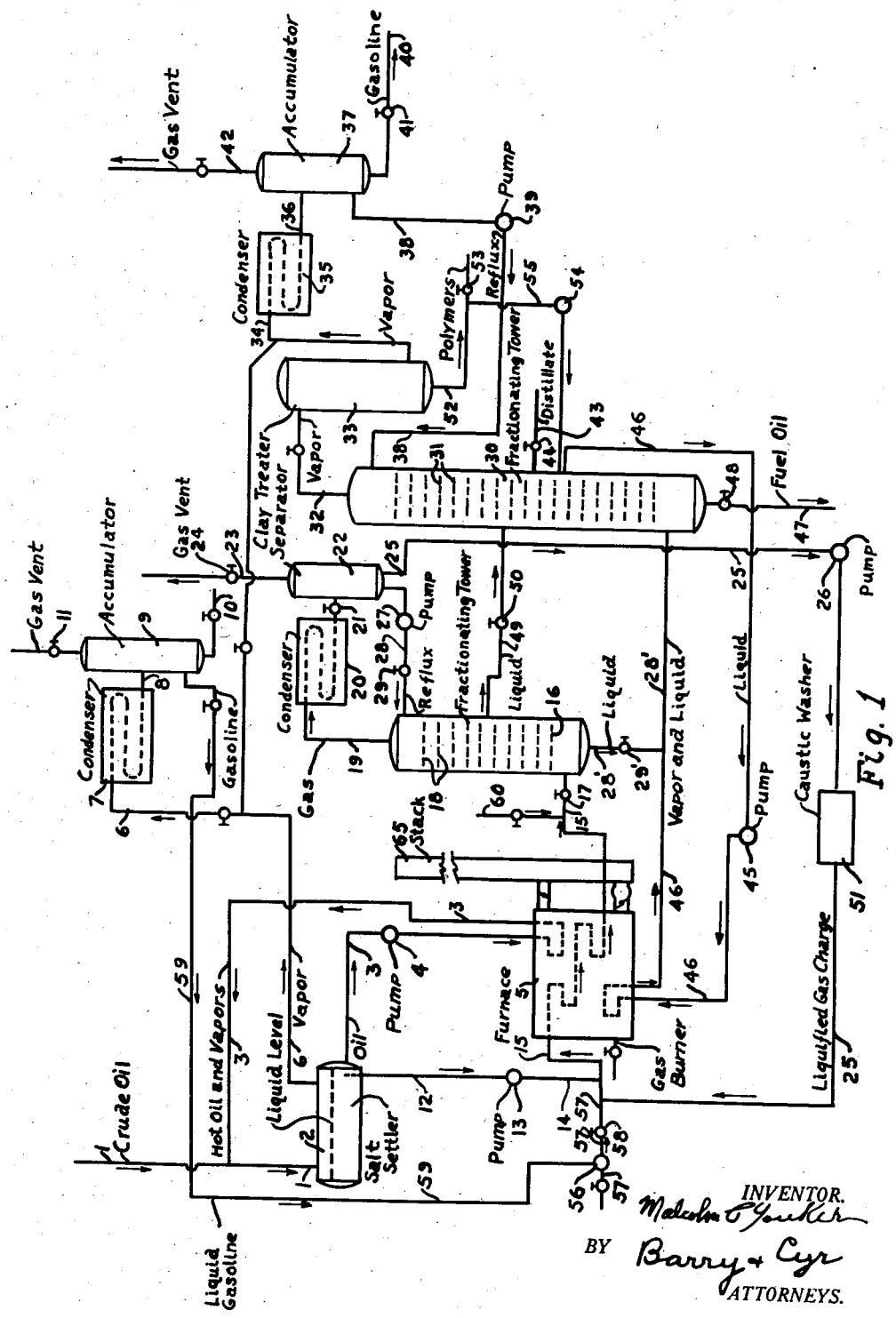
Figure 1 illustrates in elevation the complete apparatus.

Crude oil will be delivered through the pipe 1 into the salt settler 2 which is a horizontal cylindrical tank. A liquid level normally above the center of the salt settler 2 will be maintained. Liquid will be delivered from the tank 2 through the pipe 3 by means of the pump 4 through a furnace 5 and into the pipe 1. The liquid thus delivered through pipe 3 will be heated in passing through the furnace 5 and being delivered into the pipe 1 will mix with and heat the crude oil flowing through the pipe 1 into the salt settler 2. As a result of heating the crude oil entering the salt settler 2, vapors will be generated therein, and these vapors will flow through the pipe 6 into condenser 7. Condensate will flow from the condenser 7 through the pipe 8 into the accumulator 9. The temperature maintained in the salt settler 2 will be insufficient to crack the oil and only such that gasoline vapors distilled therefrom will flow into the condenser 7, and therefore, gasoline only will be accumulated in the accumulator 9. Gasoline may be withdrawn from the accumulator 9 through the valved pipe 10. Gases will be vented from the accumulator 9 through the vent pipe 11. Liquid will be withdrawn from the salt settler 2 through a pipe 12 by a pump 13 and will be delivered by pump 13 through pipe 14 and thence through a heating tube 15 which passes through furnace 5 and delivers into the lower portion of fractionating tower 16. A valve 17 which is mounted in heating tube 15 between furnace 5 and fractionating tower 16 will be utilized to maintain pressure in heating tube 15. Liquid which is passed through the heating tube 15 will be heated therein and will, upon entry into the fractionating tower 16, to a large extent, vaporize, and the vapors thus generated will flow upward through the fractionating tower 16 and bubble trays 18, and thence through pipe 19 and condenser 20 and pipe 21 into the gas-liquid separator 22.

Gas which will accumulate in the separator 22 in gaseous condition will be vented therefrom through the pipe 23 in which is mounted a valve 24. A part of the gas which will accumulate in liquid state in the separator 22 will be pumped therefrom through the pipe 25 by means of the pump 26 into and through heating tube 15. A part of the liquefied gas which will accumulate in the separator 22 will be delivered thence by pump 27 through pipe 28 in which is mounted valve 29 into the top of fractionating tower 16. As a result of delivering said liquid through pipe 28 into the top of fractionating tower 16, liquid reflux will flow downward through fractionating tower 16 over bubble trays 18 and will contact and condense a portion of the vapors which will rise through fractionating tower 16, and as a result of said condensation, liquid, consisting of gasoline and heavier fluid, will accumulate in the fractionating tower 16. Liquid which will collect in the bottom of fractionating tower 16 will flow thence through pipe 28' in which is mounted a valve 29' into a fractionating tower 30 at a point below the bubble trays 31 which are mounted in fractionating tower 30.

Pressure will be maintained in fractionating tower 16 in excess of the pressure which will be maintained in the fractionating tower 30, and, as a result, liquid flowing from fractionating tower 16 through pipe 28' into fractionating tower 30, will partially vaporize upon entry into fractionating tower 30, and vapors thus generated will flow upward through bubble plates 31 in fractionating tower 30, and thence through pipe 32, clay treater 33, pipe 34, and condenser 35. Condensate will flow from condenser 35 through pipe 36 into accumulator 37.

A sufficient quantity of the liquid which will gather in the accumulator 37 will be pumped therefrom through pipe 38 by means of pump 39 into the top of fractionating tower 30 to maintain a temperature at the top of fractionating tower 30 such that only gasoline vapors will pass therefrom to the condenser 35. Thus gasoline only will be delivered into the accumulator 37.

Gasoline will be withdrawn from accumulator 37 through the pipe 40 in which is mounted valve 41. Gas will be vented from accumulator 37 through vent pipe 42. As a result of introducing cold gasoline into the top of fractionating tower 30, reflux liquid will flow downward over bubble plates 31 and will condense that part of the vapors rising through fractionating tower 30 which is heavier than gasoline. Distillate which is heavier than gasoline may be withdrawn from one of the bubble trays 31 which is intermediate between the point of entry of pipe 28' in fractionating tower 30 and the top of fractionating tower 30 through a pipe 43 in which is mounted a valve 44. Distillate will be delivered by a pump 45 from one of the bubble plates 31 through a pipe 46 which will pass through furnace 5 and lead into the pipe 28'.

The liquid which will be passed through pipe 46 will be heated in passage through furnace 5 and will, upon entry into the pipe 28', heat the liquids which will flow from the fractionating tower 16 through the pipe 28'.

Fuel oil will be withdrawn from the bottom of fractionating tower 30 through pipe 47 in which is mounted valve 48. A pipe 49 in which is mounted a valve 50 will serve to conduct liquid from an intermediate one of the bubble trays 18 in fractionating tower 16 into fractionating tower 30 at a point above the entry point of pipe 28' into fractionating tower 30.

A conventional caustic washer 51 is mounted in the pipe 25 and serves to remove hydrogen sulfide and other impurities from the liquefied gas which flows through the pipe 25.

A pump 56 is mounted in a pipe 57 in which is mounted a valve 58 and which leads into heating tube 15 by means of which straight run gasoline, hydrocarbon gas, either in liquid or gaseous form, fuel oil, hydrogen, or any other hydrocarbon material or treating agent may be introduced into and passed through the heating tube 15. I may elect to deliver gasoline collected in the accumulator 9 and into and through the heating tube 15 by means of the pump 56 and the valved pipe 59.

Water or water containing treating agents, either in suspension or in solution, or treating agents alone, may be introduced through valved pipe 60 into the heated hydrocarbon which will flow from the furnace through heating tube 15 into fractionating tower 16.

Crude oil being preheated and delivered into salt settler 2 will flow slowly through this salt settler and any salt contained in the crude, as well as other debris, will be settled from the crude therein and will be periodically removed.

A body of fuller's earth will be so disposed in the clay treater 33 that vapors may readily flow through this body of clay and intimately contact the particles thereof. Polymerized hydrocarbon liquids which will be formed in the clay treater 33 as a result of the contact between vapors and fuller's earth therein, will be withdrawn therefrom through a pipe 52 in which is mounted a valve 53. These polymerized hydrocarbons may either be withdrawn to storage or they may be delivered by means of a pump 54 which is mounted in a pipe 55 into fractionating column 30.

The pressure maintained in the salt settler 2 will be only that which is set up therein by resistance to flow of vapors through the pipe 6 and the condenser 7. Although good results may be obtained at lower pressures, I will preferably maintain a pressure of approximately 3000 pounds per square inch in the heating tube 15. Normally the pressure set up at the discharge of the pumps 13 and 26 will be 3000 pounds per square inch, and pressure taken at intermediate points along the heating tube 15 will be less than 3000 pounds per square inch by the amount of friction heat between the point of which such pressure is taken and said pumps. A pressure of between 200 pounds per square inch and 1000 pounds per square inch, preferably about 500 pounds per square inch, will be maintained in the fractionating tower 16, the separator 22, the condenser 20, and inter-connecting pipes.

The pressure maintained in the fractionating column 30, the clay treater 33, condenser 35 and inter-connecting lines will be only in excess of atmospheric pressure, to the extent that pressure is set up by reason of the resistance to flow of vapors and condensate through this system, as the accumulator 37 will be operated at approximately atmospheric pressure.

The length of that part of the pipe 3 which will be exposed to heat in the furnace 5 will be so proportioned that the liquid which will enter the salt settler 2 will be heated to about 250° F. Therefore, nothing heavier than gasoline will be vaporized in the salt settler 2.

By regulation of the quantity of fuel fired in the furnace 5, the temperature to which the liquid passed through heating tube 15 will be heated will vary between 800° F. and 900° F., and this temperature will preferably be between 845° F. and 865° F. The temperature maintained at the top of the fractionating tower 16 by means of regulating the delivery of reflux liquid into the top of this tower will be such that the vapor pressure of the liquid leaving the bottom of this fractionating tower will be in accord with the current specifications for motor fuel, which at this time vary between 8 pounds per square inch and 13 pounds per square inch when taken by the Reid method at 100° F. That part of the pipe 46 which will be exposed to heat in the furnace 5 will be so proportioned that the bottom of the fractionating tower 30 will be heated to the extent necessary to remove from the liquids which will collect in the bottom of fractionating tower 30 practically all gasoline fractions.

The heating tube 15 is divided into a heating portion and a conversion portion after the manner which has already been disclosed in applications for patent filed by the present applicant under the following listed patent applications:

U. S. Serial No. 399, filed January 4, 1935; U. S. Serial No. 545,309, filed June 18, 1931; U. S. Serial No. 579,044, filed December 4, 1931; and U. S. Serial No. 579,538, filed December 7, 1931.

As outlined in the above mentioned applications for patents, in order to avoid rapid deposition of coke in the apparatus and to at the same time obtain satisfactory conversion in the heating tube 15 of the materials passed therethrough, it is desirable to first rapidly heat these materials to conversion temperatures in the first part of the heating tube 15 and then pass the thus heated material through a latter portion of the heating tube 15 which is so arranged in the furnace as to be only mildly heated.

Figure 3:
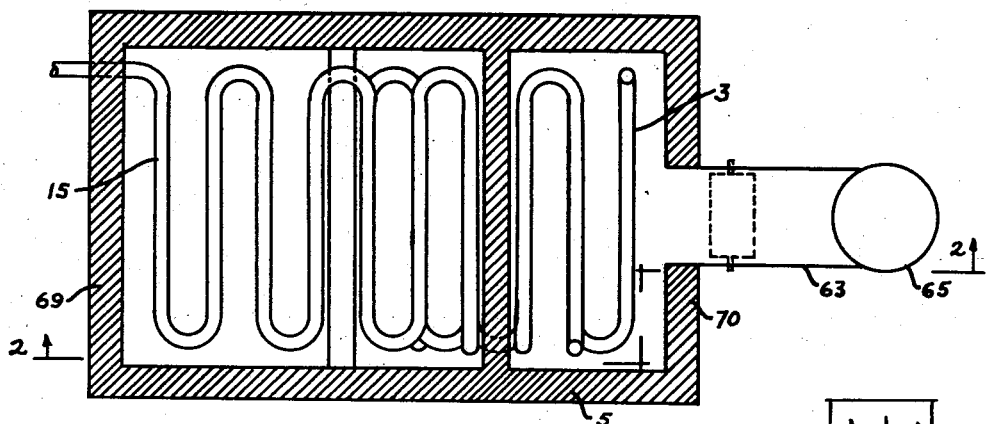
Figure 3 is a plan view of the furnace 5, the top of which is shown removed thus revealing the arrangement of the baffle walls and heating tubes in the interior of the furnace.
Figure 2:
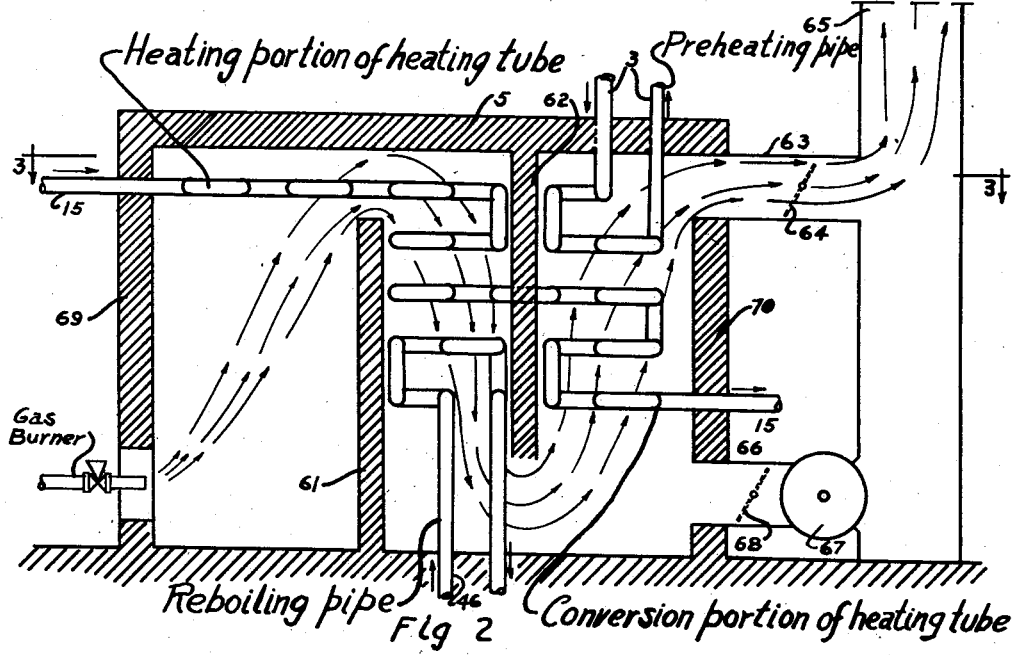
Figure 2 is an elevation of the furnace 5 shown in Figure 1, the side wall of the furnace being shown removed and the arrangement of the heating tubes and baffle walls in the furnace thereby being revealed.

Referring to Figures 2 and 3 of the drawings, it will be noted that the interior of the furnace 5 is so partitioned off by a bridge wall 61 and a baffle wall 62 that a combustion chamber is formed between bridge wall 61 and the end wall 69 of the furnace and that gases of combustion developed in this combustion chamber are restricted to flow upward over the top of bridge wall 61 thence downward through a passageway between bridge wall 61 and baffle wall 62 thence under baffle wall 62 and thence upward through a passageway between bridge wall 62 and the adjacent end wall 70 of the furnace and thence through a breeching 63 in which is mounted a damper 64 and thence upward through a smoke stack 65. A breeching 66 in which is mounted a fan 67 and a damper 68 is inter-connected between the bottom of said last-mentioned passageway between said baffle wall and said adjacent end wall and the bottom of said smoke stack 65. The fan 67 may be operated to force gases of combustion from the smoke stack into the furnace, thus recirculating gases of combustion through said last-mentioned passageway, or said fan may be allowed to remain stationary in which case gases of combustion will flow from the furnace into the smoke stack through the breeching 66, and in either case the damper 68 may be used to regulate the flow of gases of combustion through the breeching 66. Temperature recording devices not shown on the drawings are of course installed at the junction of the heating portion and the conversion portion and at the outlet of the heating tube 15 to indicate and record the temperature of material passing through the heating tube at these points. The heating tube 15 is made up of a plurality of horizontal tubes interconnected by means of return bends in a conventional manner and is supported in the furnace by conventional tube sheets which are not shown. That portion of the heating tube 15 which is utilized for the rapid heating of the materials passed therethrough to conversion temperature is so disposed over the combustion chamber and in the passageway between bridge wall 61 and baffle wall 62 that gases of combustion developed in the combustion chamber immediately and before contacting any other heat absorbing surface are contacted therewith. The conversion portion of the heating tube 15 in which conversion of the materials passed therethrough takes place is disposed in the passageway between the baffle wall 62 and the adjacent end wall 70 of the furnace. That portion of the pipe 46 which passes through the furnace 5 is disposed in the passageway between bridge wall 61 and baffle wall 62 and in a position below the heating portion of the heating tube 15. That portion of the pipe 3 which passes through furnace 5 is disposed in the passageway between the baffle wall 62 and the adjacent end wall 70 of the furnace in a position above the conversion portion of the heating tube 15.

It will be seen that the flow of gases of combustion through the furnace 5 is such that these gases first contact the heating portion of the heating tube 15; second, contact that portion of the pipe 46 which passes through the furnace 5; third, contact the conversion portion of the heating tube 15; and, fourth, contact that part of the pipe 3 which passes through the furnace 5. The quantity of liquid which will be pumped through the pipe 46 will be so regulated and the length and size of that portion of the pipe 46 which is disposed in the furnace 5 will be so proportioned as to reduce the temperature of the gases of combustion passing around the pipe 46 to any desired temperature before these gases contact the conversion portion of the heating tube 15. Increasing the flow of oil through pipe 46 will cool the gases of combustion passing over the conversion portion of the heating tube 15 to any desired temperature and in this way heat transfer from the gases of combustion to the conversion portion of the heating tube 15 may be caused to take place at a low rate and the quantity of heat so transferred may be regulated. It is apparent that some other stream of liquid might be passed through the pipe 46 to accomplish this purpose and that my reasons for using the particular stream of liquid designated are economic.

The manner in which the breeching 66, together with the fan 67 and the damper 68, may be advantageously used to abstract gases of combustion from the furnace before the same have passed over the conversion portion of the heating tube 15 or to force recirculation of gases from the smoke stack back into the furnace and over said conversion portion of said tube is already disclosed in the above-mentioned patent application Serial No. 579,044, previously filed by the present applicant.

Circulating gases of combustion from the bottom of the smoke stack 65 by means of the fan 67 through the breeching 66 into the furnace and thence upward through the passageway between baffle wall 62 and end wall 70 and thence through breeching 63 into smoke stack 65 in regulated quantities will result in regulated cooling of the gases of combustion prior to their passage over the conversion portion of heating tube 15, thus permitting regulated moderate heating of the materials passing through the conversion portion of heating tube 15. Withdrawing gases of combustion in regulated quantities from the furnace 5 into smoke stack 65 through the breeching 66 will result in regulating the quantity of gases of combustion which will flow over the conversion portion of the heating tube 15 and will thus result in the regulated moderate heating of the materials passing through the conversion portion of the heating tube 15.

It should be noted that while finally contacting gases of combustion with the preheating pipe 3 is an economic arrangement the principally advantageous feature of the furnace and heating arrangement shown is that the gases of combustion after being contacted with the heating portion of the heating tube 15 are cooled by being contacted with the heating pipe 46 before being contacted with the conversion portion of the heating tube 15, thus permitting mild heating of said conversion portion of said tube.

The materials passed through the heating tube 15 should be heated in passing therethrough to a maximum temperature in the heating portion of this tube and the temperature of these materials should not thereafter be increased in passing through the conversion portion of the tube. In other words, a portion of the heating tube 15 adjacent to the exit end of said tube should be heated in a manner such that only heat absorbed by the conversion reaction is supplied to the materials flowing therethrough and such that the temperature of such materials is not increased in passing through this latter portion of said heating tube. The conversion portion of the heating tube 15 should be of substantial length. While some results may be obtained by using a three inch inside diameter tube as short as 500 feet, it is desirable to use a three inch inside diameter tube at least 2000 feet long, and preferably 3000 or 4000 feet long, for conversion purposes, through which the material to be converted is flowed after such material has been brought to conversion temperature. While I have described the desirable conditions which should be obtained in the conversion portion of the heating tube 15, I would say that in order to obtain results sufficiently practical to permit commercial operation it is absolutely necessary that not less than the latter 500 linear feet of the heating tube 15 be supplied with heat in quantity such that the temperature of the materials passing therethrough be raised not more than two degrees Fahrenheit per 100 feet of travel through said latter portion of heating tube 15 and as stated above heat should preferably be supplied to the materials passing through the latter portion of said heating tube in considerably less than this quantity.

The maximum advantageous temperature to be used will be found to vary with the type of material undergoing conversion. I have constructed and have in operation two heating tubes similar to the heating tube 15 herein described, one of which, is used for the conversion of heavy fuel oil to gasoline and gas oil and one of which is used for converting gas oil to gasoline. I find that maintaining temperatures of approximately 850° F. and 840° F., respectively, at the inlet and the outlet of the conversion portion of the heating tube obtains very good results in the conversion of the fuel oil when operated under a pressure of about 350 pounds per square inch, while for the advantageous conversion of gas oil temperatures of approximately 885° F. and 875° F., respectively, maintained at the inlet and outlet of the conversion portion of the heating tube appear to be the best temperatures when operating under about 350 pounds per square inch pressure. It should be noted that while the present process is specifically outlined for and appears to be particularly advantageous for the conversion of crude oils the process may also be advantageously utilized for the conversion of other oils such as fuel oil or gas oil.

It appears that the conversion of oils, which already contain gasoline, to gasoline may be accomplished particularly well by the combination of steps outlined herein; that is, by passing the same through the heating tube 15 in the manner described under a pressure upwards of 1500 pounds per square inch particularly in that the antiknock rating of the gasoline as a whole thus produced from crude oil is high.

In the present application I am claiming the fractionating method disclosed in my prior application Serial No. 579,538 dated Dec. 7, 1931.

While I have described in detail a method by which my new process may be carried out, it is to be understood that I do not intend to limit my claims to these details but intend to claim broadly all of the advantages which are inherent in this process.

What I claim and desire to secure by Letters Patent is:

1. In a process of the character described, in producing thermally converted hydrocarbons in heated condition into the lower portion of a first rectification zone maintained under relatively high superatmospheric pressure, rectifying said hydrocarbons in said zone and thereby effecting a relatively sharp separation between normally gaseous hydrocarbons and normally liquid hydrocarbons, discharging said normally gaseous hydrocarbons from the upper portion of said zone and cooling and condensing some of the same, returning some of said condensate in liquefied condition into the upper portion of said rectification zone for refluxing said zone, dividing said normally liquid hydrocarbons into a plurality of streams and after releasing the pressure on the same introducing these streams at different elevations into a second rectification zone maintained under substantially atmospheric pressure, heating the lower portion of the second rectification zone by withdrawing a portion of the normally liquid hydrocarbons, heating the withdrawn portion and returning the same to the lower portion of the second rectification zone, rectifying the normally liquid hydrocarbons in the second rectifying zone and thereby separating hydrocarbons in the gasoline range from heavier hydrocarbons, discharging the hydrocarbons in the gasoline range from the upper portion of the second rectification zone and condensing the same, returning a portion of the resulting condensate into the upper portion of the second rectification zone as a reflux, and withdrawing hydrocarbons heavier than gasoline from the second rectification zone.

2. In a process for converting hydrocarbon fluids in which the fluid is subjected to pressure conversion in a conversion zone from which the resulting mixture is removed, the improvement which comprises rectifying said mixture in a first rectification zone under a pressure sufficient to maintain some of the normally gaseous components of the mixture in liquefied condition, discharging normally gaseous components from the top of said rectification zone and cooling the same to condense a heavier portion of said normally gaseous components, then passing said gaseous components into a separating zone and separating the condensate from the uncondensed portion, discharging the uncondensed portion from said separating zone, passing a portion of said condensate from the separating zone into the upper portion of said rectification zone and using it as a reflux to prevent normally liquid hydrocarbons from leaving the upper portion of said rectification zone, passing another portion of said condensate in liquid condition to the inlet of the conversion zone, passing a light liquid fraction from the medial portion of said rectification zone into the medial portion of a second rectification zone maintained under lower pressure, passing a heavier liquid fraction from the lower portion of the first rectification zone into the lower portion of the second rectification zone, withdrawing a distillate stream from the second rectification zone at a point between the points where the liquid fractions are introduced into the same, reheating said distillate stream and mixing it with said heavier liquid fraction before the latter enters the second rectification zone, whereby the lower portion of the second rectification zone is heated sufficiently to cause gasoline in vapor phase to be discharged from the upper portion of the second rectification zone, condensing the gasoline vapors discharged from the upper portion of the second rectification zone, withdrawing a part of the gasoline condensate as a product of the process, and returning a part of the gasoline condensate to the upper portion of the second rectification zone as a reflux.

MALCOLM P. YOUKER.